Aug. 1, 1939.  F. G. W. BRISTOW  2,168,189

CUTTER FOR SHEARING MACHINES

Filed Sept. 1, 1937  2 Sheets-Sheet 1

F. G. W. Bristow
Inventor

Glascock Downing Seebold
Attys.
By

Patented Aug. 1, 1939

2,168,189

UNITED STATES PATENT OFFICE 2,168,189

CUTTER FOR SHEARING MACHINES

Franciss George William Bristow, Eastwood, near Sydney, New South Wales, Australia Application September 1, 1937, Serial No. 162,028
In Australia September 7, 1936

5 Claims. (Cl. 30—221)

The invention relates to cutters for sheep shearing machines of the type that are stamped out of solid metal universally used since the invention of shearing machines.

The cutter usually has a flat face with its teeth or prongs triangular in shape there being usually two, three or more of these teeth or prongs. In some of the known forms of cutters the pressure of the machine fork is applied to the cutter back directly, and the teeth or prongs thereof receive their pressure from this source only.

It has also been proposed to place tension upon the triangular part of the teeth directly from the fork of the handpiece. In such case efforts have failed because no cutter will operate satisfactorily on the comb unless pressure is not only applied at the front but at the heel of the cutter so as to keep it flat on the face of the comb.

It is not possible in the above make of cutter to convey the pressure beyond the back of the cutter owing to the triangular shape of the teeth, and the deflected top to the point of the tooth, therefore the pressure is not as forward to the point of the teeth of the cutter as could be desired.

An object of the present invention is to carry the pressure from the fork directly on to the teeth of the cutter as far forward to the points as may be desired.

A further object of the invention is to convey the pressure applied by the usual means, through a plate that will permit the pressure to be distributed at the point or points of contact between the cutter and the comb, the plate being slightly flexible permitting an even pressure being applied to the tooth or teeth at the point of contact with the fork by means of which it derives its pressure.

A still further object of the invention contemplates the provision of a plate in the form of a beam which produces to a great extent the same effect upon the under resistance or pressure to the cutting of the wool as is done in machines that have been fitted with beam pressure plates to the forks for overcoming the under pressure when in use.

The present invention may or may not be a fixture to the cutter and can be attached to the fork if desired and engage the cutter in that manner.

According to the present invention an arched or flat plate is disposed upon the cutter in such manner that it makes contact at the back or heel of the cutter and also as far forward upon the teeth of the cutter as is practicable and to this plate the pressure for keeping the cutter and comb in engagement, is applied.

It is important that the pressure plate be prevented from elongation when pressure is applied by the tension means of the handpiece, otherwise the tension will not be effective. In other words the application of the pressure is useless unless the two ends of the plate are securely held to the cutter. If the two ends are so held any desired pressure may be applied at any point of the plate and transferred effectively to the desired contact points.

It is also essential that the plate be rigidly connected to the cutter as the former must be used for driving the cutter across the comb; to this end means must be provided in the solid cutter for securely fastening the plate, or means must be provided whereby the plate satisfactorily grips the cutter so as to avoid relative movement thereof.

The plate may be attached to the cutter for instance by screws or rivets or it may be engaged with the cutter in any suitable manner provided that it moves therewith. For instance the means for securing the plate to the cutter may be the means which are provided for effecting the driving connection between the cutter and the means provided for its reciprocation.

It will be appreciated that various means may be provided whereby the cutter may be secured to the plate or the plate to the cutter. For instance pins or lugs may be formed on the plate to engage holes or slots in the cutter or the pins or lugs may be formed integral with the cutter and engage corresponding orifices or slots in the plate, the arrangement in either case serving to prevent relative movement between the cutter and the plate.

The shape of the plate is immaterial, for instance it may be convex or flat when viewed from above provided that it transfers the pressure as far forward as is desirable and also distributes pressure to the heel of the cutter.

An important feature of the present invention is that it distributes the pressure upon the cutter in such manner that the desired pressure of the cutter upon the comb is applied to the cutter teeth as far forward as is required to prevent the cutter lifting from the comb during the cutting of the wool and to prevent the wool lifting the cutter, while at the same time ensuring that the desired pressure is applied to other parts of the cutter.

In order that the invention may be more readily understood reference will now be made to the accompanying drawings, wherein:

Figures 8, 9, 10 and 11 show the cutter in a modified form wherein Figure 8 is a plan view of the cutter, Figure 9 is a plan of the associated pressure plate, Figure 10 is a front elevation of the cutter showing the pressure plate in correct relation to said cutter, while Figure 11 is a side elevation corresponding to Figure 10.

Figures 12, 13, 14 and 15 are a further modification of the cutter wherein Figure 12 is a plan of the cutter, Figure 13 is a plan of the associated pressure plate, Figure 14 a front elevation of the cutter showing the pressure plate in correct relation to said cutter, while Figure 15 is a side elevation corresponding to Figure 14.

Figures 16, 17, 18 and 19 show yet a further modified form of the cutter, wherein Figure 16 is a plan of the cutter, Figure 17 is a plan of the associated pressure plate, Figure 18 a front elevation of the cutter showing the pressure plate in correct relation to said cutter, while Figure 19 is a side elevational view corresponding to that of Figure 18.

Figure 1:
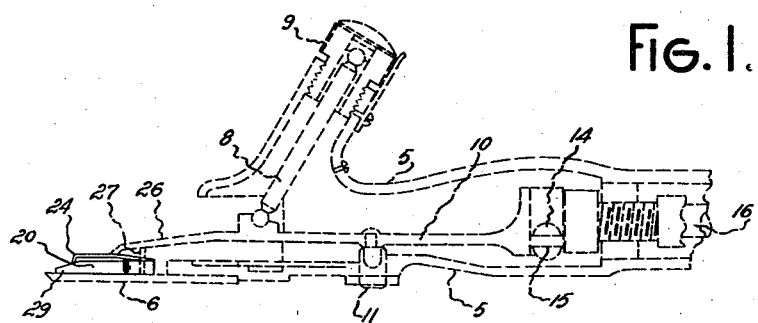
Figure 1 is a sectional elevation through a shearing machine hand piece showing the position of the cutter and the pressure plate, the cutter and plate being shown in full lines.
Figure 2:
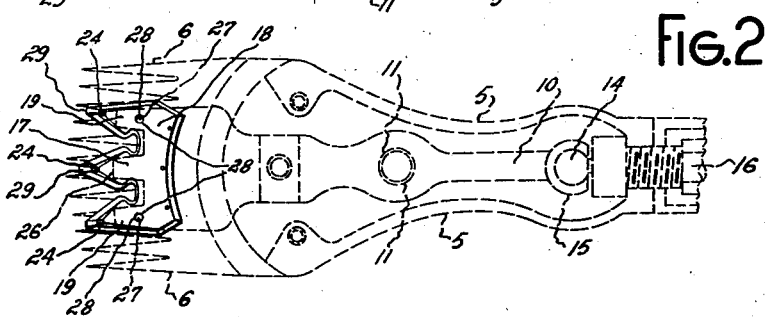
Figure 2 is a plan view of the device shown in Figure 1.

The shearing machine handpiece, Figures 1 and 2, has been illustrated to show the application of pressure to the pressure plate and need not be described in detail, as it does not form part of the invention. It comprises a body 5, comb 6, cutter 20, tension applying means comprising the shaft 8 and knurled member 9, cutter lever 10, screwed pivot 11 and driving means 14, 15, and 16.

Figures 3, 4:
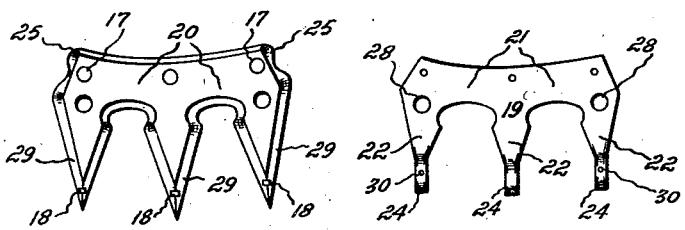
Figure 3 is a plan view of a well known form of cutter having means incorporated therewith for securing the pressure plate thereto.
Figure 4 is a plan view of one form of pressure plate in accordance with the present invention.
Figures 5, 6:
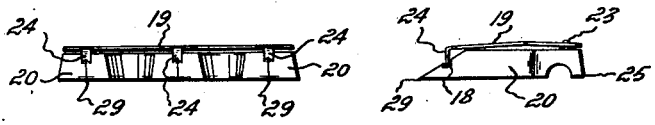
Figure 5 is a front elevation showing the pressure plate disposed upon a three tooth cutter of known design.
Figure 6 is a side elevation corresponding to Figure 5.
Figure 7:
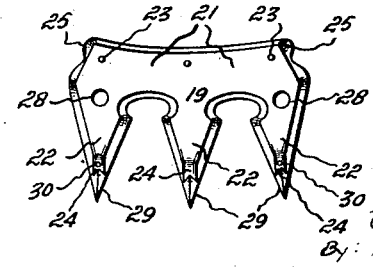
Figure 7 is a plan view of a cutter and pressure plate as seen in Figures 5 and 6.
Figure 8:
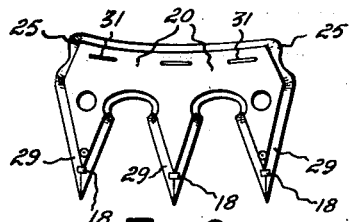
Figure 9:
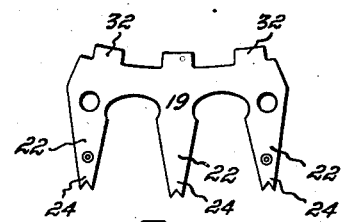
Figure 10:
Figure 11:
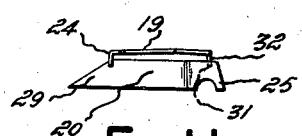
Figure 12:
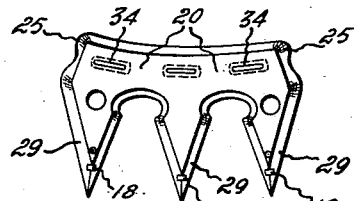
Figure 13:
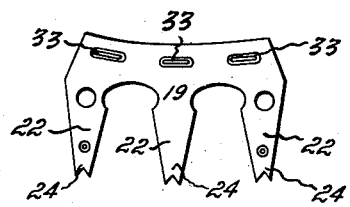
Figure 14:
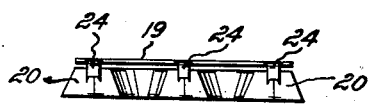
Figure 15:
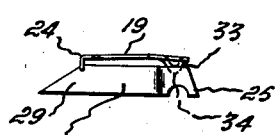
Figure 16:
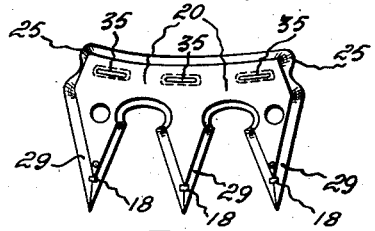
Figure 17:
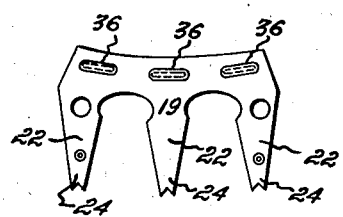
Figure 18:
Figure 19:
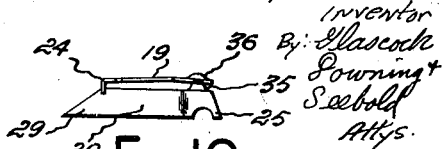

Referring now to Figures 3, 5, 6 and 7 which illustrate one form of the invention, the cutter 20 which may be in the form of any of the well known types of cutters has holes 17 and slots 18 for retaining securely thereon the plate 19, Figure 4. The plate is disposed over the cutter but does not engage or contact wholly with the upper surface of the said cutter 20.

As illustrated in Figures 4, 5, 6 and 7 the plate 19 has a body 21 and three arms 22 made preferably of resilient material. The body 21 of the plate 19 is supported above the cutter 20 by means of distance pieces and as illustrated is secured to the cutter by screws or rivets 23 passed through the holes 17. Other suitable means however may be used for positioning or securing the body of the plate upon the cutter or vice versa.

At its forward end the plate 19 is shown engaging the cutter 20 by means of tongues 24 which are formed on the ends of the arms 22 and engage the slots 18 in the upper part of the respective teeth 29 of the cutter 20.

Instead of the slots 18 in the cutter, holes, or grooves of other shape may be provided to engage the tongues 24. In fact any suitable means may be provided on the cutter 20 or on the plate 19 whereby the tension or pressure is applied to the heel 25 of the cutter 20 and at a point on the teeth as far forward as is practicable with a view to attaining the foregoing objects.

For example in Figures 8, 9, 10 and 11 the cutter 20 has slots 31 to receive lugs 32 formed on the plate 19, while in Figures 12, 13, 14 and 15 depressed lugs 33 are provided on the plate 19 to be received in depressions 34 in the cutter 20.

In Figures 16, 17, 18 and 19 lugs 35 are formed on the cutter 20 to be received in depressions 36 formed in the plate 19.

In the form of handpiece illustrated, the pressure or tension applied to the cutter 20 is effected by the parts 8 and 9 through the cutter lever 10.

It is necessary to provide means for driving the cutter and to this end by way of example, the cutter lever 10 illustrated has a forked end 26 and carries pins 27 (see Figures 1 and 2) which are adapted to enter holes in the cutter 20 corresponding with and coinciding with holes 28 formed in the pressure plates 19.

The forked end 26 of the cutter lever 10 rests upon the tongues 24 of the pressure plate 19 and applies pressure thereto, which pressure is then distributed by the said plate 19 in the desired manner to the heel 25 of the cutter 20 and to the teeth 29 thereof in a forward position.

In other types of handpieces the tension or pressure is applied to the cutter by means of "crows' feet" which extend from the cutter bar 10 and have conical projections engaging orifices or slots in the plate 19. With this form of hand piece the pressure plate 19 is provided with suitable orifices 30, or slots upon the upper face of the tongues 24. If desired the pressure plate 19 may be formed integral with the cutter lever 10.

It will be appreciated that various modifications may be made in the manner in which the plate and cutter are associated and operated without departing from the spirit of the invention.

I claim:

1. The combination with the cutter of a sheep shearing machine having an oscillating fork, of a plate for transferring pressure to said cutter from the fork, said plate having means for engaging the heel of the cutter and having tongues which engage the teeth of said cutter.

2. The combination with the cutter of a sheep shearing machine having an oscillating fork, of a plate for transferring pressure to said cutter from the fork, said plate being secured to the heel of the cutter and having a plurality of tongues which exert pressure on the teeth of said cutter.

3. The combination with the cutter of a sheep shearing machine having an oscillating fork, of a flexible plate for transferring pressure to said cutter from the fork, said plate having means for engaging the heel of the cutter and having a plurality of tongues the extremities of which are bent over to engage recesses in the teeth of said cutter.

4. The combination with a toothed cutter for a sheep shearing machine, of a flexible plate having a plurality of tongues so arranged that downward pressure is exerted on the teeth adjacent the extremities thereof, said plate having projections on the rear portion which engage complementary recesses in the heel of the said cutter.

5. The combination with a toothed cutter for a sheep shearing machine, of a flexible plate having a tongue engaging each tooth of the cutter, said plate having recesses in the rear portion, complementary projections on said cutter engaging said recesses, and the extremities of said tongues being turned down to engage recesses adjacent to the extremities of said teeth and exert pressure on the latter.

FRANCISS G. WILLIAM BRISTOW.